United States Patent Office 2,764,572
Patented Sept. 25, 1956

2,764,572

COMPOUNDED RUBBER STOCK

Alphonse Pechukas, Pittsfield, Mass., assignor to Columbia-Southern Chemical Corporation, Allegheny County, Pa., a corporation of Delaware No Drawing. Application November 4, 1952, Serial No. 318,735

6 Claims. (Cl. 260—41.5)

This invention relates to a novel method of preparing a rubber compound which is reinforced with silica. Prior to the present invention, it has been known that silica can be incorporated in rubber and the rubber composition vulcanized with consequent production of a strong, well-bonded product. In the preparation of such a product, it has been the usual practice to mill into the rubber a vulcanizing agent such as sulphur, one or more vulcanizing accelerators, one or more activators, a softener, an antioxidant, and the silica. These materials have been conventionally milled into the rubber simultaneously. Thereafter, the milled product is shaped into desired form and is vulcanized at conventional temperatures.

According to the present invention, it has been found that superior rubber compositions may be prepared by proper adjustment of the order in which the silica is introduced into the rubber composition with respect to the other components. That is, it has been found that if the silica is introduced into the rubber before other relatively polar components are introduced therein and the polar components of the rubber compound are introduced thereafter, the resulting product, when vulcanized, is found to have superior strength properties. The exact reason for this is not known. The silica used appears, under the electron microscope, to comprise a mass of loosely bonded aggregates of smaller particles, which aggregates may be termed "flocs." Best reinforcement is believed to be achieved when the rubber penetrates the pores of these flocs. However, it seems probable that certain polar components, notably the vulcanization accelerators or activators, inhibit the ability of rubber to penetrate the pores of the silica flocs. By incorporating the silica into the rubber before these components are introduced and thereafter introducing the accelerator or activator, this problem is avoided.

The term "rubber," as herein used, is intended to refer to natural rubber and the synthetic polymers of diolefin and diolefin copolymers with mono-olefin compounds which conventionally can be used in lieu of natural rubber. Typical of the synthetic rubber compositions are the butadiene polymers and butadiene copolymers, such as butadiene-1,3-styrene copolymers, butadiene-acrylonitrile copolymers and butadiene-isobutylene copolymers (butyl rubber) and like synthetic elastomers which are derived from the polymerization of butadiene-1,3,2-chlorobutadiene, isoprene or the like alone or with polymerizable olefinic compounds such as styrene, methyl methacrylate, acrylonitrile, methyl chloroacrylate or their equivalents.

Sulphur commonly is the primary vulcanization agent which is used to vulcanize rubber-silica compositions.

Typical organic accelerators which are used in the production of silica-rubber compositions are the following: guanidines such as diorthotolyl guanidine, biphenyl guanidine, and triphenyl guanidine; thiurams such as tetramethyl thiuram disulfide, tetramethyl thiuram monosulfide, tetrabutyl thiuram monosulfide, tetraethyl thiuram disulfide, tetramethyl thiuram tetrasulfide, dipentamethylene thiuram tetrasulfide, and the like; dithiocarbamates such as methyl zimate (zinc dimethyl dithiocarbamate), ethyl zimate (zinc diethyl dithiocarbamate), copper diethyl dithiocarbamate, zinc dibutyl dithiocarbamate, zinc dibenzyl dithiocarbamate, selenium diethyl dithiocarbamate, and the like; thiazoles such as benzothiazyl disulfide, 2-mercapto-benzothiazole or its cupric salt, M-cyclohexyl-2-benzothiazyl sulfenamide and the like; aldehyde amines such as butyraldehyde-aniline, heptaldehyde-aniline, and the like; and xanthates such as zinc butyl xanthate and the like.

Various accelerator-activators are commonly used. These include water miscible polyhydric alcohols such as ethylene glycol, diethylene glycol, triethylene glycol, glycerol, etc., water miscible amines and alkylol amines such as ethylene diamine, monoethanol amine, triethanol amine and the like, stearic acid, olic acid, as well as various metal oxides such as zinc oxide.

Softeners or plasticizers normally used include mineral oil and other liquid hydrocarbons, coumarone-indene resins, and various organic esters or metallic soaps such as methyl acetyl ricinoleate, benzyl ricinoleate, castor oil, dibutyl tartrate, dioctyl phthalate, etc.

Antioxidants used include: phenyl beta naphthylamine, diphenyl-p-phenylene diamine, di-o-tolyl ethylene diamine, and various phenols.

Many of the above compounds are highly polar and some are only slightly polar. Generally speaking, esters, amines, alcohols, acids, and salts are quite polar while hydrocarbons such as benzene have little polarity. Sulphur is essentially nonpolar. Metal oxides, on the other hand, are highly polar as are most of the above listed accelerators. The polarity of a compound may be determined readily by determining its dipole moment. In general, compounding ingredients having a dipole moment above about 0.6 electrostatic unit should not be added to rubber until the silica has been milled in.

The invention may be applied to use in connection with various finely divided silica products which contain in excess of 85 per cent $SiO_2$ on the completely water-free basis, that is, on a basis excluding both absorbed or free water and bound water. Thus, silica prepared by burning ethyl silicate or silicon tetrachloride in an atmosphere of oxygen may be used in accordance with the present invention.

The improved results are especially marked when a finely divided hydrated silica prepared by precipitation in aqueous medium by reaction of an acid or acidic material with a metallic silicate, such as sodium silicate or calcium silicate, is subjected to use according to this invention. Such products are finely divided hydrated amorphous silica which contains $SiO_2$ and bound water in the proportion corresponding to the formula: $H_2O \cdot (SiO_2)_x$ where $x$ is a number in excess of 3 but rarely in excess of about 50. Such silica normally has a surface area of about 25 to 200, preferably 50 to 175, square meters per gram, a particle size in the range of 0.015 to 0.04 micron, and may also contain small amounts of other metals but generally contains less than 2 per cent, preferably less than 1 per cent, by weight of $Na_2O$.

In silica of this character, two types of water are present. These types are termed "bound water" and "free water." The term "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from the silica pigment by heating the pigment at ignition temperature, for example, 1000 to 1200° C., until no further water can be removed, minus the amount of free water in the pigment. The amount of free water in the pigment normally will range between 1 to 10 per cent by weight of the total pigment.

Typical silica pigments of the type here contemplated are described in application of Edward M. Allen, Serial No. 283,721, filed April 22, 1952, and in application of Alphonse Pechukas, Serial No. 290,536, filed May 28, 1952.

Typical methods of preparing silica of this character are as follows:

EXAMPLE I

Streams of aqueous sodium silicate solution containing 100 grams per liter of $SiO_2$ as $Na_2O(SiO_2)_{3.36}$, and calcium chloride solution containing 100 grams per liter of $CaCl_2$ and 30 to 40 grams per liter of sodium chloride were fed directly into the central area of a centrifugal pump at 150° F.

The rates of flow were adjusted so that calcium chloride was approximately 10 per cent in excess over the stoichiometric quantity required for reaction, and so that the amount of liquid supplied to the pump was about 25 per cent below the output capacity of the pump. In consequence, the solutions were subjected to turbulent intermixing in the pump.

The slurry of calcium silicate thus produced was introduced into a tank and sufficient hydrochloric acid solution containing 28 per cent by weight of HCl was added, with stirring, to reduce the pH of the slurry to 2. Thereupon, sufficient sodium hydroxide solution containing 40 per cent by weight of NaOH was added to raise the pH of the slurry to 7.5. The precipitated silica was recovered by decantation and filtration, and was dried in an oven at a drying temperature of 120 to 140° C. for 12 hours. The free water content of the product was within the range of 3 to 8 per cent by weight of the pigment.

EXAMPLE II

An aqueous solution of sodium silicate was prepared by diluting 5.88 liters of sodium silicate containing 298 grams per liter of $SiO_2$ as sodium silicate having the composition $Na_2O(SiO_2)_{3.36}$, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $R_2O_3$ (iron and aluminum) | 1.30 |
| CaO | 5.88 |
| MgO | 1.36 |

EXAMPLE III

Twenty-six hundred gallons of sodium silicate solution containing 18 grams per liter of NaCl and 20 grams per liter of $Na_2O$ as the sodium silicate, $Na_2O(SiO_2)_{3.3}$, was placed in a 4000-gallon tank. Carbon dioxide gas containing 10 per cent by volume of $CO_2$, the balance being nitrogen, was introduced into the solution over a period of 3 hours while holding the solution at 30° C. at a rate sufficient to react with all of the sodium silicate and convert 20–25 per cent of the $Na_2O$ content thereof to bicarbonate. Thereafter, the resulting slurry was boiled for one hour, filtered, and washed. The filter cake was reslurried and a solution of $Al_2(SO_4)_3 \cdot 18H_2O$ in quantity sufficient to introduce into the slurry ½ per cent of Al based upon the weight of $SiO_2$ in the slurry, was added to the slurry. Thereafter, the slurry was stirred briefly and enough hydrochloric acid was added to adjust the pH to 5.7. The resulting slurry was filtered and the filter cake dried.

The formulation of the rubber composition is effected by milling the silica into the dry rubber and thereafter adding some or all of the other components. The rubber should not, in any event, contain the organic accelerator.

Preferably, it should contain little or no fatty acid, such as stearic or oleic acid. On the other hand, these components frequently are present in synthetic rubber compositions, such as GR–S, and these components also are present in small amount in natural rubber. Removal of these minor quantities is not usually necessary.

After the silica has been milled into the rubber, it frequently is advantageous to permit it to age for 12 or more hours in order to achieve optimum results. While an improvement is observed without such aging before the other compounding ingredients are introduced, the aging before such introduction serves to improve the character of the composition.

Following the compounding, the rubber is formed into the desired shape and is vulcanized at the usual vulcanizing temperatures, for example, 250 to 375° F.

The following examples are illustrative:

Example A

The following formulation was used in preparing a series of rubber stock:

| | Percent by weight |
|---|---|
| Natural rubber | 76.0 |
| Darex 34 (butadiene-styrene polymer having high styrene content) | 24.0 |
| Cumar Ex | 10.0 |
| Silica | 60.0 |
| Zinc oxide | 5.0 |
| Iron oxide | 6.0 |
| Wyex | 3.0 |
| Santoflex B | 0.67 |
| Santoflex 35 | 0.33 |
| Ethylac | 0.8 |
| Methyl Tuads | 0.2 |
| Sulfur | 2.5 |
| Benzoic acid | 0.75 |
| Laurex | 3.0 |
| Reogen | 2.4 |
| Water | 3.4 |

In test No. 1, the natural rubber was milled in a Banbury mill for 3 minutes. One-half of the silica as prepared according to the process of Example I was added and the mixing was continued for 5 minutes. Thereupon, the remainder of the silica was added and mixing continued for 12 minutes. This rubber mixture was sheeted quickly from the mill and permitted to age for one week.

At the end of the week, the resulting rubber composition was placed in a Banbury mill along with the Darex 34 and mixed for 2 minutes. Then the remainder of the ingredients except the sulfur, Reogen (a mixture of an oil soluble sulphonic acid and a paraffin oil), and water were introduced and the mixing continued for one minute. The water and Reogen were added and after a total of 5 minutes the batch was dumped and transferred to an open mill. The sulfur was then added and after the stock was well blended it was sheeted into a sheet having a thickness of 0.28 inch, for curing. This product is designated in the table below as sample No. 1.

A second sample, designated sample No. 2, was prepared by milling together the natural rubber, Darex 34, and Cumar Ex for 2 minutes in a Banbury. One-half of the silica was added with all of the other ingredients except the Reogen, sulfur, and water, and milling was continued for 5 minutes. Thereupon, the remainder of the silica with the waer and Reogen was added and milling continued. After a total milling time of 17 minutes, the batch was dumped and transferred to an open mill where the sulfur was milled in and the stock was sheeted as in the case of sample No. 1.

A third sample was prepared substantially in the same way that sample No. 1 was prepared except that the aging was omitted.

These samples were vulcanized by heating for 10 minutes at 307° F. They were then subjected to flex tests according to standard established methods for determining flex resistance and the following results were obtained:

TABLE I

| Sample No. | Length of Cut After Flexing (Inches) | | | |
|---|---|---|---|---|
| | Number of Cycles | | | |
| | 5,000 | 15,000 | 25,000 | 35,000 |
| 1 | 0.28 | 0.38 | 0.44 | 0.49 |
| 2 | 0.42 | 0.58 | 0.73 | 0.89 |
| 3 | 0.34 | 0.48 | 0.59 | 0.66 |

It will be noticed by comparing samples Nos. 1 and 3 with sample No. 2 that a substantial improvement in flexure resulted by introducing the silica first, the best results being obtained when the product was aged before incorporating the additional ingredients.

*Example B*

In this series the following formulation was used in preparing the stocks described below:

|  | Percent by weight |
|---|---|
| Natural rubber | 55.0 |
| GR–S–X478 (cold rubber) | 25.0 |
| Marbon 8000 (high styrene copolymer) | 20.0 |
| Zinc oxide | 5.0 |
| Hi-Sil | 60.0 |
| Iron oxide | 6.0 |
| Wyex | 3.0 |
| Sulfur | 3.0 |
| Altax | 0.2 |
| DOTG | 1.2 |
| Santoflex B | 0.67 |
| Santoflex 35 | 0.33 |
| Benzoic acid | 0.75 |
| Stearic acid | 3.0 |
| Triethanolamine | 2.0 |

TABLE II

| Sample No. | Minutes' Cure at 316° F. | Length of Cut after Flexing (inches) | | | | | | | | |
|---|---|---|---|---|---|---|---|---|---|---|
| | | Number of Cycles | | | | | | | | |
| | | 10,000 | 20,000 | 30,000 | 40,000 | 50,000 | 75,000 | 100,000 | 150,000 | 200,000 |
| 4 | 8 | 0.20 | 0.21 | 0.26 | 0.27 | 0.29 | 0.35 | 0.40 | 0.49 | 0.55 |
| 5 | 8 | 0.16 | 0.22 | 0.26 | 0.27 | 0.31 | 0.34 | 0.39 | 0.44 | 0.54 |
|   | 10 | 0.17 | 0.20 | 0.25 | 0.30 | 0.30 | 0.38 | 0.44 | 0.54 |  |
| 6 | 8 | 0.13 | 0.21 | 0.30 | 0.35 | 0.40 | 0.50 | 0.60 | 0.79 |  |
|   | 10 | 0.17 | 0.26 | 0.35 | 0.39 | 0.43 | 0.50 | 0.57 | 0.68 |  |

In preparation of sample 4, the natural rubber was milled in a laboratory Banbury mill for 3 minutes. One-half of the silica was then added and mixing continued for 5 minutes. The remainder of the silica was added and mixing continued, the total time of mixing being 12 minutes. This mixture was sheeted out and allowed to age for 4 days.

The aged product was placed on a roller mill and the GR–S–X478 was added slowly. The Marbon 8000 and the remainder of the dry ingredients were mixed in, the sulfur being mixed last. After careful blending, the triethanolamine was added and the stock sheeted off the mill to form a sheet of 0.28 inch in thickness.

Sample 5 was prepared by milling the natural rubber and the GR–S–X478 in a laboratory Banbury mill for 3 minutes. One-half of the silica was added and mixing continued for 5 minutes. The remainder of the silica was added and mixing was continued, the total time of mixing being 12 minutes. This product was permitted to age for 4 days.

The aged product was placed in the Banbury mill along with the Marbon 8000 and blended for 2 minutes. The remainder of the dry ingredients except the sulphur were added and mixing continued for 2 minutes. The triethanolamine was added and after one minute milling, the stock was transferred to an open roller mill. The sulfur was added and after 10 minutes, the stock was sheeted to form a sheet 0.28 inch in thickness.

In preparation of sample 6, the natural rubber, GR–S–X478, and Marbon 8000 were placed in the Banbury and blended for 2 minutes. One-half of the silica and all of the dry ingredients except the sulfur were added and mixing continued for 5 minutes. The balance of the silica and the triethanolamine were added and mixing continued, the total time of mixing being 17 minutes. Sulfur was thoroughly blended into this mixture using a roller mill and the mixture sheeted to form a sheet 0.28 inch in thickness.

It will be noted that the flex resistance of samples Nos. 4 and 5 was superior to that of sample No. 6, thus showing that a substantial improvement accrued by introducing the silica first.

*Example C*

In this example, the formulation was as follows:

|  | Parts by weight |
|---|---|
| GR–S butadiene-styrene copolymer | 100.0 |
| Zinc oxide | 5.0 |
| Sulfur | 3.0 |
| Agerite powder | 1.0 |
| Altax | 1.2 |
| Methyl Tuads | 0.15 |
| Silica (prepared as in Example I) | 58.5 |
| Ethylene glycol | 3.5 |

Sample B was prepared in the normal manner by milling the GR-S with all of the other ingredients simultaneously. Sample A was prepared by milling the silica into the GR-S before introduction of the other components. Following introduction of silica into the rubber, the other components were milled in and the products vulcanized and tested for tensile and tear strengths according to standard test methods.

TABLE III

| Compound | Time of Cure at 280° F. | Modulus at 300% Elongation (pounds per square inch) | Tensile Strength (pounds per square inch) | Tear Strength (pounds per square inch) |
|---|---|---|---|---|
| Sample A | 10 | 920 | 1,910 | 200 |
| | 15 | 1,280 | 1,630 | 160 |
| | 20 | 1,360 | 1,600 | 120 |
| | 30 | 1,450 | 1,590 | 140 |
| | 45 | 1,460 | 1,530 | 160 |
| | 60 | 1,450 | 1,600 | 160 |
| Sample B | 10 | 400 | 1,820 | 230 |
| | 15 | 770 | 1,570 | 140 |
| | 20 | 910 | 1,330 | 150 |
| | 30 | 940 | 1,230 | 130 |
| | 45 | 950 | 1,260 | 140 |
| | 60 | 960 | 1,360 | 150 |

Although the present invention has been described with reference to the specific details of certain embodiments thereof, it is not intended that such details shall be regarded as limitations upon the scope of the invention except insofar as included in the accompanying claims.

What is claimed:

1. In a method of preparing a rubber composition containing silica, the improvement which comprises milling finely divided, hydrated, amorphous silica characterized by the presence of flocs and having an average ultimate particle size in the range of 0.015 to 0.04 micron and a surface area of 50 to 200 square meters per gram into rubber which is essentially free from polar compounds including vulcanizing ingredients; and, after said silica is thoroughly distributed throughout said rubber, thereafter milling vulcanizing ingredients into the rubber, and vulcanizing the product.

2. The method of claim 1 wherein the silica is a finely divided silica containing the composition $H_2O(SiO_2)_x$, where $x$ is 3 to 50, and having a surface area of 50 to 200 square meters per gram.

3. The process of claim 1 wherein the polar compound has a dipole moment of at least 0.6 electrostatic unit.

4. A method of preparing a rubber composition which comprises milling dry silica having a surface area of 50 to 200 square meters per gram into dry rubber which is essentially free from vulcanizing ingredients, allowing the rubber stock to age for a period of at least about 12 hours, milling vulcanizing ingredients into the rubber, and vulcanizing the product.

5. The method of claim 4 wherein the silica is a finely divided silica having the composition $H_2O(SiO_2)_x$, where $x$ is 3 to 50, and having a surface area of 50 to 200 square meters per gram, said silica containing 2 to 10 per cent of free water.

6. A method of preparing a rubber composition which comprises milling dry pulverulent silica having a surface area of 50 to 200 square meters per gram with rubber which is essentially free from polar compounds, allowing the milled product to age for at least 12 hours, milling vulcanizing ingredients into the rubber, and vulcanizing the rubber.

References Cited in the file of this patent

UNITED STATES PATENTS

| 2,118,601 | Gerke et al. | May 24, 1938 |
| 2,502,949 | Howlett et al. | Apr. 4, 1950 |
| 2,560,043 | Schmidt | July 10, 1951 |

OTHER REFERENCES

Allen et al.: India Rubber World, August 1949, pages 577–581 and 586.